8042X
No Printed Specification Available
W. & T. SCHNEBLY.
Making Spikes.
Patented March 3, 1834.
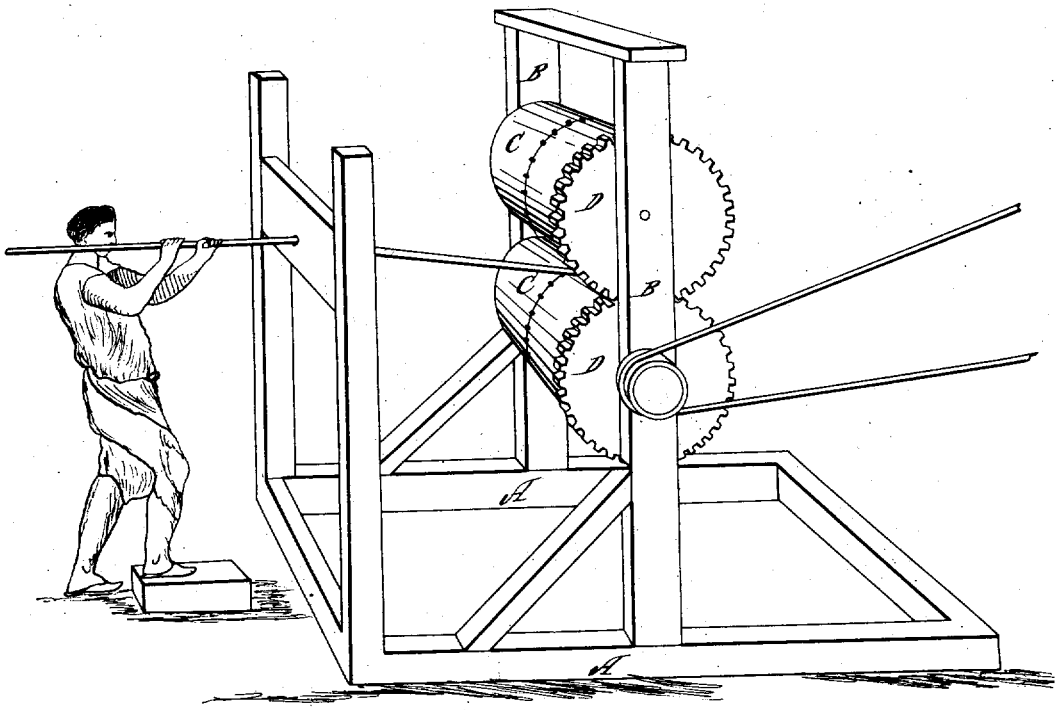
N. PETERS, Photo-Lithographer, Washington, D. C.

William & Thos Schnebly
of Hagerstown Maryland.

Letters Patent.

The schedule referred to in these Letters Patent and making part of the same containing a description in the words of the said William and Thomas Schnebly themselves of their improvement for making wrought Nails, Spikes, Tacks, Horseshoe rivets, Horseshoe nails and screw bolts &c.

To all to whom these presents shall come

Be it known that we William and Thomas Schnebly in the County of Washington and State of Maryland have invented a new and useful improvement in making wrought nails, Spikes, Tacks &c &c and that the following is a full and exact description of the construction and operation of said Machine as invented by us and titled the machine to make wrought Nails, Spikes, Tacks, Horse shoe rivets, Horseshoe nails and screw bolts &c &c This Machine is to be made of proper materials of proper size and dimensions to consist of a frame or ground work with two uprights opposite to each other with cap and braces and of proper height, upon these uprights must be fixed two cylinders made of cast iron or steel, or any thing that will answer the purpose, the cylinders to be laid horizontally and one immediately above the other of equal diameter and equal length, with even surfaces so as them to close upon each other, the regularity of their motion to be kept up by cog gearing or otherwise on either end of the cylinders or gudgeons, on the opposite end of either the moving power may be applied, next in a latitudinal manner all the way around the circum- -ference of each cylinder, cut with [illegible] the impression of half a nail, spike, tack, &c. &c. letting each nail spike tack or whatever article you may want to make have a separate groove or row of impressions for making the same, as for example let a row of impressions be made for nails one for spikes, one for tacks, &c. &c. The half impressions on each cylinder to correspond precisely with each other, each half impression of nails, spikes or tacks &c. to be made in close succession so that there will not be left standing in the row of each groove or impression more of the cylinder than will ensure the purpose of cutting off the different nails, spikes tacks, horse shoe rivets, horse shoe nails, and screw bolts, These rows of impressions may be made as far apart as will be necessary; on wide cylinders or you may make but one row of impressions on each pair of cylinders, These impressions may be made likewise in a longitudinal manner, Then by introducing heated rods of iron into these different grooves or rows of impressions, nails, spikes, tacks, horse shoe rivets, horse shoe nails and screw bolts &c. &c. will be made rapidly and perfectly, Next let a director be placed in front of the cylinders, which is to give proper direction to the iron rods intended for either row of impressions by having in it a hole opposite each row of impressions We therefore claim the right of the invention for making Nails, Spikes, Tacks, Horseshoe rivets, Horseshoe nails, and Screw bolts &c. &c. by the two cylinders with one half impression of each article to be made upon each corresponding [illegible] with each, except the horse shoe, which varies as the two sides are not alike one side having a groove for nail holes, the other plain.

W.m [illegible]
[illegible] [illegible]

Witnesses
[illegible] Lambert
George [illegible]

Drawing made

[illegible]

[illegible] N.196